(12) United States Patent
Hasegawa et al.

(10) Patent No.: US 7,972,461 B2
(45) Date of Patent: Jul. 5, 2011

(54) HERMETICALLY SEALED CONTAINER AND MANUFACTURING METHOD OF IMAGE FORMING APPARATUS USING THE SAME

(75) Inventors: Mitsutoshi Hasegawa, Yokohama (JP); Kazuo Koyanagi, Atsugi (JP); Masahiro Tagawa, Isehara (JP); Nobuhiro Ito, Yamato (JP); Yasuo Ohashi, Naka-gun (JP); Shigeto Kamata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 12/136,181

(22) Filed: Jun. 10, 2008

(65) Prior Publication Data
US 2009/0000731 A1    Jan. 1, 2009

(30) Foreign Application Priority Data

Jun. 27, 2007  (JP) ................................. 2007-168883
Jun. 2, 2008   (JP) ................................. 2008-144695

(51) Int. Cl.
*B32B 37/12* (2006.01)
(52) U.S. Cl. ..................... 156/272.8; 156/60; 156/273.7
(58) Field of Classification Search ............... 156/273.3, 156/273.5, 275.3, 273.7, 272.8
See application file for complete search history.

(56) References Cited

U.S. PATENT DOCUMENTS

| | | | |
|---|---|---|---|
| 6,036,567 A * | 3/2000 | Watkins ........................ | 445/25 |
| 6,060,113 A | 5/2000 | Banno et al. .................... | 427/78 |
| 6,210,245 B1 | 4/2001 | Sando et al. .................... | 445/6 |
| 6,220,912 B1 | 4/2001 | Shigeoka et al. ............... | 445/24 |
| 6,254,449 B1 | 7/2001 | Nakanishi et al. .............. | 445/25 |
| 6,309,691 B1 | 10/2001 | Hasegawa ........................ | 427/8 |
| 6,390,873 B1 | 5/2002 | Banno et al. .................... | 445/6 |
| 6,419,746 B1 | 7/2002 | Banno et al. .................... | 118/323 |
| 6,506,089 B2 | 1/2003 | Nakanishi et al. .............. | 445/25 |
| 6,511,358 B2 | 1/2003 | Banno et al. .................... | 445/24 |
| 6,511,545 B2 | 1/2003 | Banno et al. .................... | 118/688 |
| 6,514,559 B1 | 2/2003 | Miyamoto et al. .............. | 427/78 |
| 6,582,548 B1 * | 6/2003 | Dautartas et al. ............. | 156/272.8 |
| 6,600,263 B1 | 7/2003 | Ito .................................. | 313/495 |
| 6,621,220 B1 | 9/2003 | Hasegawa et al. ............. | 313/634 |
| 6,624,586 B2 | 9/2003 | Abe et al. ...................... | 315/169.1 |
| 6,685,982 B2 | 2/2004 | Hasegawa ........................ | 427/8 |
| 6,693,376 B1 | 2/2004 | Ito et al. ......................... | 313/495 |
| 6,741,087 B2 | 5/2004 | Kimura et al. ................. | 324/754 |
| 6,761,606 B2 | 7/2004 | Ito et al. ........................ | 445/24 |
| 6,761,925 B2 | 7/2004 | Banno et al. ................... | 427/78 |

(Continued)

FOREIGN PATENT DOCUMENTS

EP  1 077 464 A1   2/2001

(Continued)

*Primary Examiner* — Khanh Nguyen
*Assistant Examiner* — Margaret Squalls
(74) *Attorney, Agent, or Firm* — Fitzpatrick, Cella, Harper & Scinto

(57) ABSTRACT

A manufacturing method of a hermetically sealed container, comprises steps of placing, on a first member, a first bonding material and a second bonding material having a larger compressibility in relation to a pressing force than a compressibility of the first bonding material, such that the first and second bonding materials are arranged side-to-side relationship, and the first bonding material has a height lower than a height of the second bonding material; pressing a second member to the second bonding material; heating and melting sequentially part by part the first bonding material; and cooling the first bonding material to bond together the first and second members.

10 Claims, 6 Drawing Sheets

U.S. PATENT DOCUMENTS

| | | | |
|---|---|---|---|
| 6,762,547 B2 | 7/2004 | Arai et al. | 313/481 |
| 6,809,469 B1 | 10/2004 | Ito et al. | 313/495 |
| 6,815,001 B1 | 11/2004 | Mishima et al. | 427/8 |
| 6,821,551 B2 | 11/2004 | Hasegawa | 427/8 |
| 6,847,161 B2 | 1/2005 | Ito | 313/495 |
| 6,879,096 B1 | 4/2005 | Miyazaki et al. | 313/495 |
| 6,927,533 B1 | 8/2005 | Ito et al. | 313/495 |
| 6,937,041 B2 | 8/2005 | Kimura et al. | 324/754 |
| 6,962,516 B2 | 11/2005 | Ohki et al. | 445/63 |
| 6,991,507 B2 | 1/2006 | Ito et al. | 445/24 |
| 7,081,029 B2 | 7/2006 | Tagawa et al. | 445/24 |
| 7,091,662 B2 | 8/2006 | Hasegawa et al. | 313/555 |
| 7,119,482 B2 | 10/2006 | Tokioka | 313/292 |
| 7,157,850 B2 | 1/2007 | Miyazaki et al. | 313/495 |
| 7,180,233 B2 | 2/2007 | Ito et al. | 313/495 |
| 7,195,533 B2 | 3/2007 | Hasegawa | 445/24 |
| 7,226,331 B2 | 6/2007 | Kamata et al. | 445/3 |
| 7,262,548 B2 | 8/2007 | Ito | 313/292 |
| 7,281,964 B2 | 10/2007 | Ito et al. | 445/24 |
| 7,309,270 B2 | 12/2007 | Ito et al. | 445/24 |
| 7,323,814 B2 | 1/2008 | Miyazaki et al. | 313/495 |
| 7,368,866 B2 | 5/2008 | Hasegawa et al. | 313/493 |
| 7,382,088 B2 | 6/2008 | Azuma et al. | 313/495 |
| 7,407,423 B2 * | 8/2008 | Aitken et al. | 445/25 |
| 2004/0152388 A1 | 8/2004 | Kimura et al. | 445/24 |
| 2004/0213897 A1 | 10/2004 | Miyamoto et al. | 427/58 |
| 2005/0127812 A1 | 6/2005 | Takatsu et al. | 313/495 |
| 2005/0162065 A1 | 7/2005 | Kojima et al. | 313/495 |
| 2006/0042316 A1 | 3/2006 | Hasegawa et al. | 65/58 |
| 2006/0061258 A1 | 3/2006 | Tagawa et al. | 313/496 |
| 2006/0164001 A1 | 7/2006 | Iba et al. | 313/495 |
| 2006/0194501 A1 | 8/2006 | Tokioka et al. | 445/25 |
| 2006/0199462 A1 | 9/2006 | Tagawa et al. | 445/24 |
| 2007/0069646 A1 | 3/2007 | Hasegawa et al. | 313/555 |
| 2007/0171350 A1 * | 7/2007 | Andoh | 349/153 |
| 2008/0079349 A1 | 4/2008 | Miyazaki et al. | 313/495 |

FOREIGN PATENT DOCUMENTS

WO  WO 00/51155  8/2000

* cited by examiner

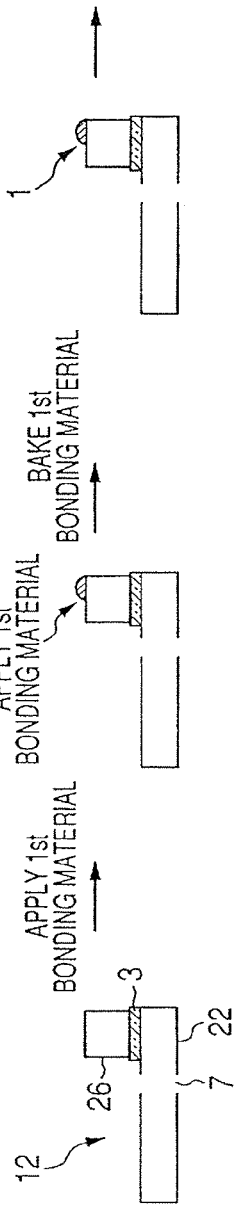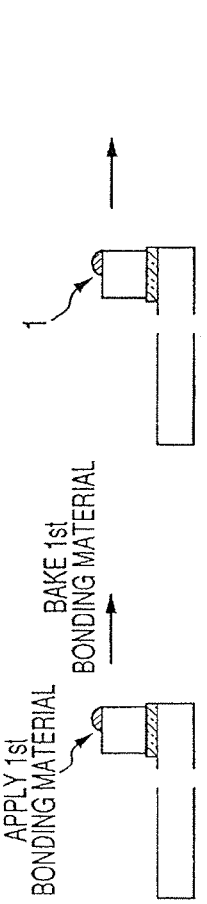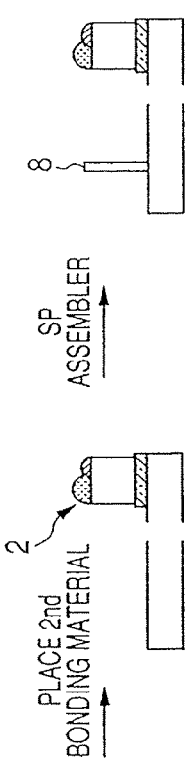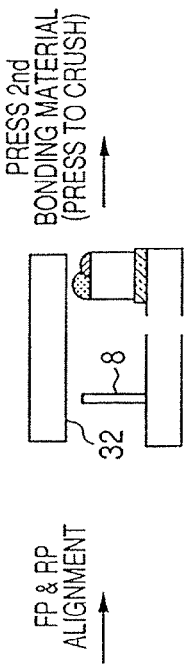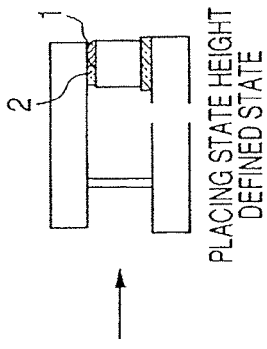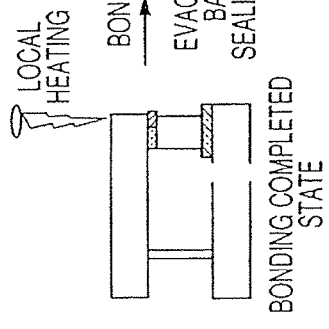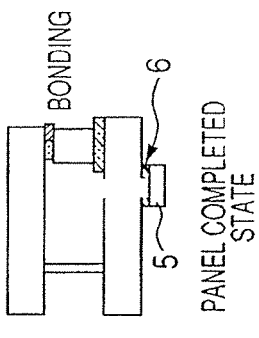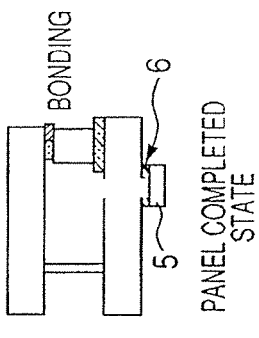

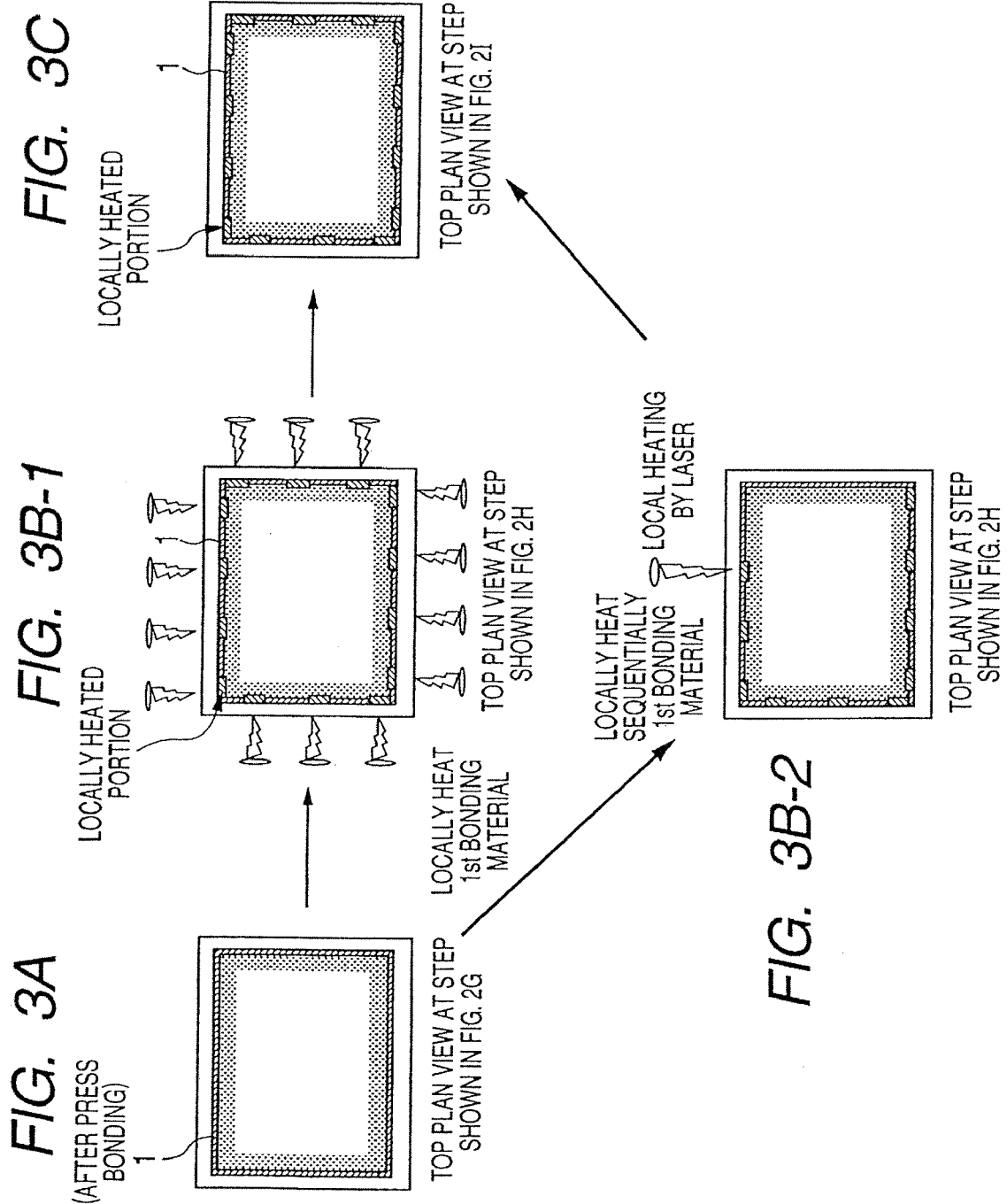

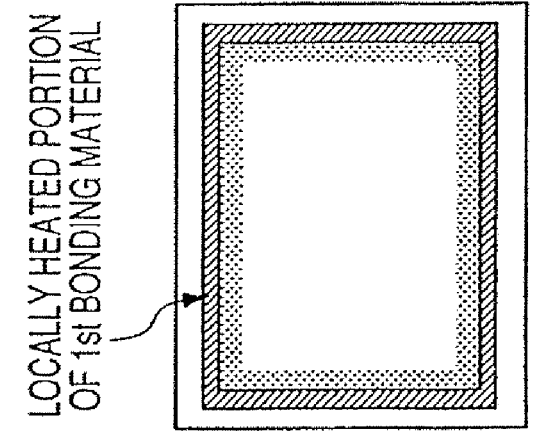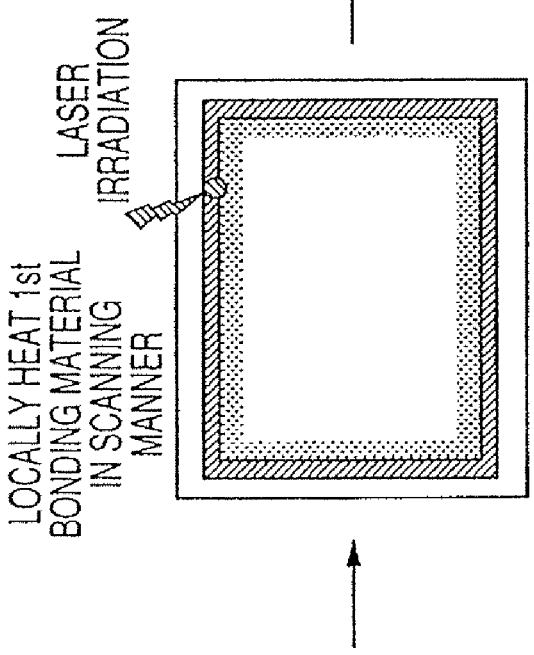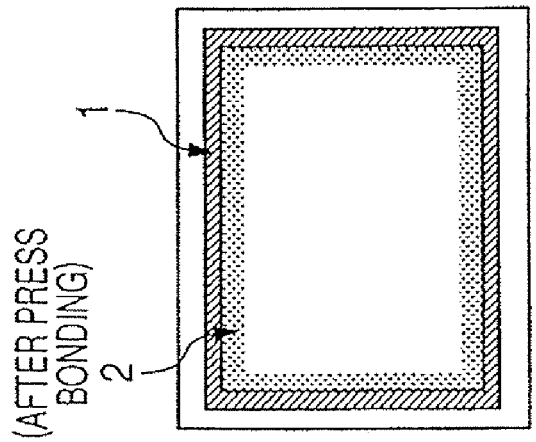

HERMETICALLY SEALED CONTAINER AND MANUFACTURING METHOD OF IMAGE FORMING APPARATUS USING THE SAME

BACKGROUND OF THE INVENTION

1. Field of the Invention

The present invention relates to a hermetically sealed container and a manufacturing method of an image forming apparatus and, more particularly, to a bonding method of an envelope of the image forming apparatus.

2. Description of the Related Art

There has been known an image forming apparatus in which a number of electron-emitting devices for emitting electrons according to an image signal are provided for a rear plate, phosphor films which receive an irradiation of the electrons, emit light, and display an image are provided for a face plate, and an inside is maintained in a vacuum state. Such an image forming apparatus often has a construction in which a supporting frame is further provided between the face plate and the rear plate, the supporting frame is bound to both of the face plate and the rear plate, and an envelope is formed. In order to allow the envelope to function as a vacuum container, it is necessary that not only a bonding portion is strictly fixed but also the bonding portion has sufficient sealing performance.

A manufacturing method of an envelope which has a bonding portion that is hermetically bound by a sealing material having a sealing function and whose hermetical bonding is reinforced by an adhesive having an adhesive function has been disclosed in Patent Document 1. According to such a technique, the sealing material is formed on one surface of the bonding portion along a circumferential length, the sealing material is heated and softened, and a member to be bound (for example, face plate) is pressed. Thus, the sealing material is fully extended to the bonding portion and high sealing performance is obtained. After that, a periphery of the sealing material is coated with the adhesive, thereby raising bonding strength. Consequently, the bonding portion having both of the sealing performance and the bonding strength is formed.

Patent Document 1: International Publication No. WO2000/51155

In the above related art, unevenness of a height of the sealing material occurs and it is demanded to further improve the hermetic sealing of the container. Specifically speaking, since the sealing material is softened when it is pressed to the member to be bound, a position of the face plate which is fixed onto the sealing material becomes unstable and there is a possibility that a thickness of bonding portion fluctuates depending on its portion. Since the sealing material is a thin member whose thickness is less than 1 mm, a small fluctuation of the thickness exerts a large influence on the sealing performance. If the sealing performance deteriorates, a vacuum degree in the envelope cannot be assured and maintained. If the position of the face plate is unstable, a possibility that the face plate is not fixed in parallel with the rear plate also occurs. There is, consequently, a risk that the unevenness of the height of the sealing material exerts a large influence on image quality.

SUMMARY OF THE INVENTION

It is an object of the invention to provide a manufacturing method of a hermetically sealed container in which a sealing material is formed at a more uniform height and hermetic sealing of the container can be further improved. Another object of the invention is to provide a manufacturing method of an image forming apparatus using such a manufacturing method of the hermetically sealed container.

According to the invention, there is provided a manufacturing method of a hermetically sealed container, comprising: a bonding material placing step of placing, on one of surfaces disposed in opposition to each other of first and second members forming the hermetically sealed container, a first bonding material and a second bonding material having a larger compressibility in relation to a pressing force than a compressibility of the first bonding material, such that the second bonding material is placed along an annular loop on the one of the surfaces disposed in opposition to each other of the first and second members, the first and second seal bonding materials are arranged in abutting (side-to-side) relationship, and the first bonding material has a height lower than a height of the second bonding material; a pressing step of pressing the first and second bonding materials by the other of the surfaces disposed in opposition to each other of the first and second members, such that both of the first and second bonding materials contact the other of the surfaces disposed in opposition to each other of the first and second members; a heating step of heating and melting sequentially part by part the first bonding material contacting the other of the surfaces disposed in opposition to each other of first and second members; and a cooling step of cooling the part melted of the first bonding material.

In the manufacturing method of the image forming apparatus according to the invention, an electron-emitting device and an image forming member are arranged, and the hermetically sealed container is manufactured by the manufacturing method of the hermetically sealed container according to the invention.

According to the invention, the manufacturing method of the hermetically sealed container whereby the sealing material is formed at the more uniform height and the hermetic sealing of the container can be further improved can be provided. According to the invention, the manufacturing method of the image forming apparatus using such a manufacturing method of the hermetically sealed container can be provided.

Further features of the present invention will become apparent from the following description of exemplary embodiments with reference to the attached drawings.

BRIEF DESCRIPTION OF THE DRAWINGS

FIGS. 2A, 2B, 2C, 2D, 2E, 2F, 2G, 2H and 2I are cross sectional views of a processing flow (bonding portion) of the invention.

FIGS. 3A, 3B-1, 3B-2 and 3C are top plan views of the bonding portion of the invention.

FIGS. 5A, 5B and 5C are schematic diagrams illustrating an example of processes according to Example 3.

DESCRIPTION OF THE EMBODIMENTS

An embodiment of the invention will be described hereinbelow. A manufacturing method of a hermetically sealed container of the invention can be desirably applied to a manufacturing method of an image forming apparatus using a vacuum container. Particularly, an image forming apparatus in which phosphor films and electron accelerating electrodes are formed on a face plate of a vacuum envelope and an electron source is formed on a rear plate is an exemplary form to which the invention is applied.

Figure 1:
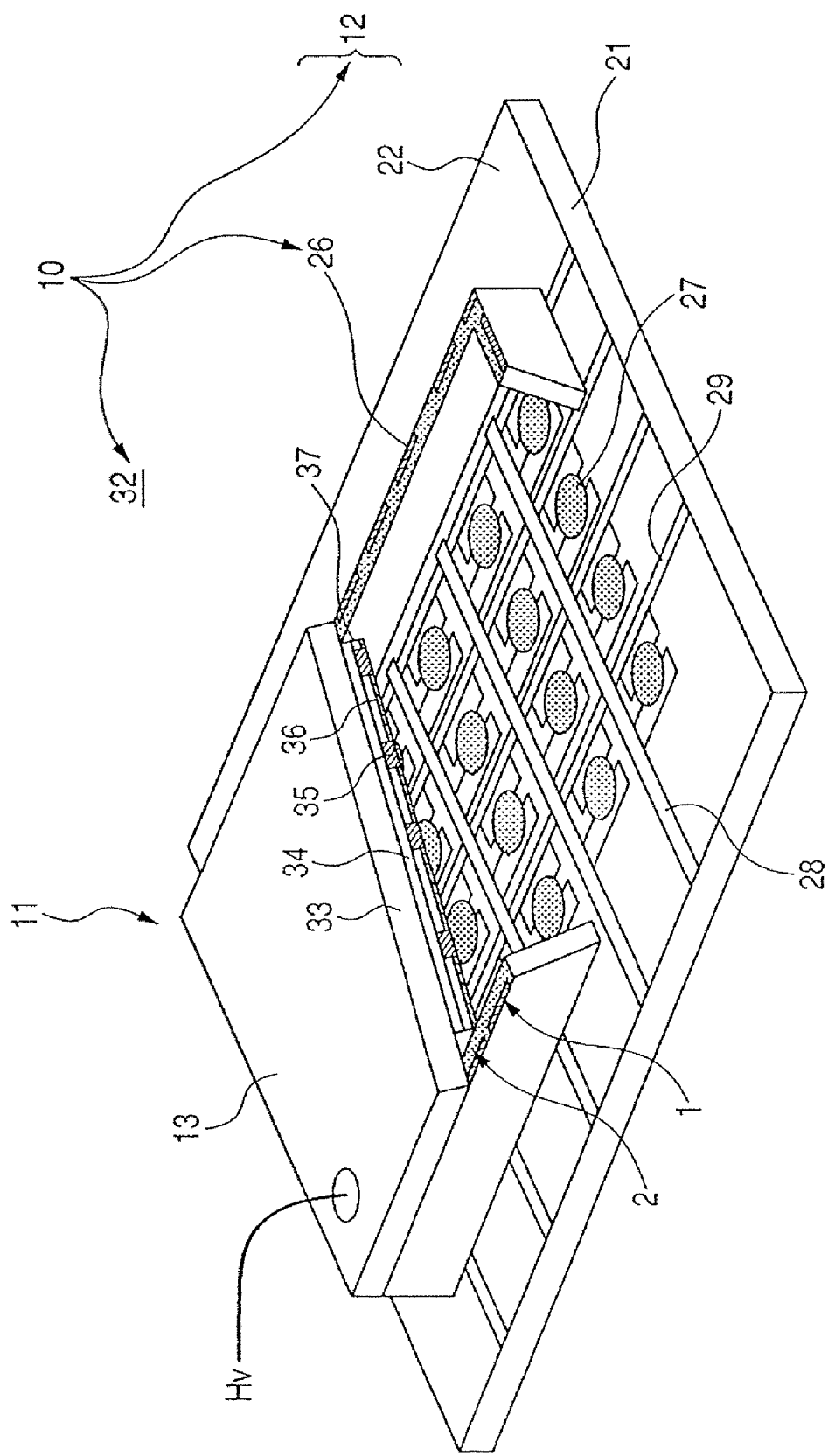
FIG. 1 is a schematic diagram of an image forming apparatus of the invention.

FIG. 1 is a perspective view illustrating an example of an image forming apparatus as a target of the invention and a part of the apparatus is cut away for easy understanding of an internal structure. An image forming apparatus 11 has an envelope 10 serving as a hermetically sealed container having a first member 12 and a second member 13 and having an internal space sealed by bonding surfaces (which face each other) of the first member 12 and the second member 13 are bound is formed. The inside of the hermetically sealed container (inside of the envelope 10) is maintained in a vacuum state. The first member 12 is formed by a rear plate (first plate) 22 and a supporting frame 26. The second member 13 is formed by a face plate 32. The surface opposite to the surface (of the supporting frame 26) fixed to the rear plate 22 becomes the surface which faces the face plate 32. Although the first member 12 is formed by bonding the rear plate 22 and the supporting frame 26, it may be formed as an integrated member. Each of the rear plate 22 and the face plate 32 has a substrate made of a glass member.

A number of electron-emitting devices 27 for emitting electrons according to an image signal are provided for a glass substrate 21 of the rear plate 22. Wirings (X-directional wirings 28, Y-directional wirings 29) for making each of the electron-emitting devices 27 operative according to the image signal are formed. Phosphor films 34 which receive an irradiation of the electrons, emit light, and display an image are provided on the glass substrate 33 of the face plate 32. Black stripes 35 are further provided on the glass substrate 33. The phosphor films 34 and the black stripes 35 are alternately arranged and provided. Metal backs 36 made of Al thin films are formed on the phosphor films 34. Each of the metal backs 36 has a function as an electrode adapted to attract the electron and receives an electric potential supplied from a high voltage terminal Hv provided for the envelope 10. Non-evaporable getters 37 made of Ti thin films are formed on the metal backs 36.

Figure 4A:
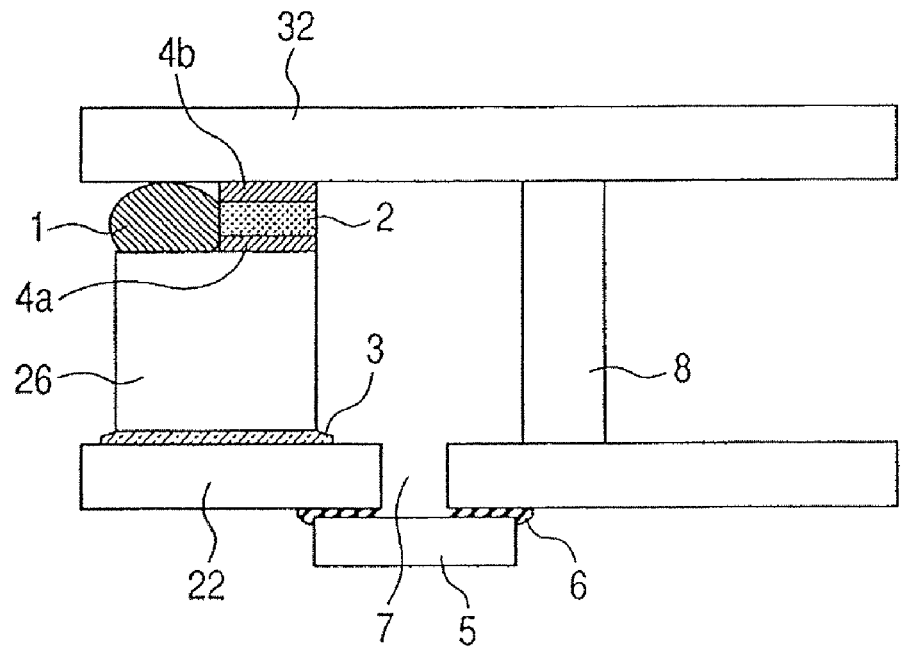
FIG. 4A is a partial cross sectional view of the bonding portion of one example of the invention. An alternative example as shown in FIG. 4B may be used.
Figure 4B:
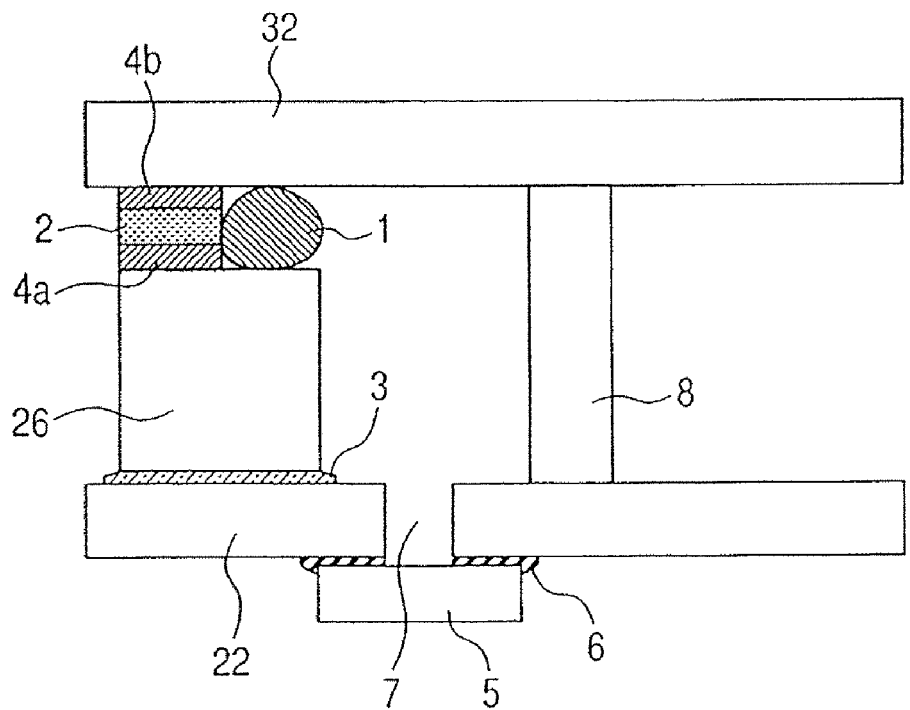

Subsequently, the embodiment of the invention will be specifically described with reference to FIGS. 2A to 4B. FIGS. 2A to 2I are cross sectional views illustrating a processing flow (bonding portion) of the invention. FIGS. 3A to 3C are top plan views of the bonding portion. FIGS. 4A and 4B are cross sectional views illustrating an example of the bonding portion.

(Step S1: Bonding Material Placing Step)

First, the first member 12 formed by bonding the rear plate 22 and the supporting frame 26 is prepared (refer to FIG. 2A). Subsequently, a first bonding material 1 is applied to the surface (of the supporting frame 26) which faces the face plate 32a along a circumferential length and is baked (refer to FIGS. 2B and 2C). The first bonding material 1 is made of a metal or glass frit. As a first bonding material 1, a bonding material whose compressibility to a pressing force is smaller than a compressibility of a second bonding material 2 is selected. A height of first bonding material 1 is set to be lower than a height of second bonding material, which will be described hereinafter. Subsequently, the second bonding material 2 whose compressibility to the pressing force is larger than the compressibility of the first bonding material 1 is applied (refer to FIG. 2D). The large compressibility denotes that the second bonding material 2 is softer than the first bonding material 1 and is liable to be pressed and deformed (which will be described in detail hereinafter). In other words, the first bonding material 1 having the small compressibility is harder than the second bonding material 2 and is difficult to be pressed and deformed. The second bonding material 2 is applied so that its height is higher than a height of first bonding material 1. The second bonding material 2 is arranged in abutting (side-to-side) relationship. Although the first bonding material 1 is applied to the outside and the second bonding material 2 is applied to the inside in the illustrated embodiment, they can be applied to the sides vice versa and it is sufficient that they are arranged in parallel. The second bonding material 2 is provided to assure not only adhesive performance of the bonding portion but also sealing. Therefore, it is desirable to apply the second bonding material 2 in an annular loop over the whole circumference of the surface (of the supporting frame 26) which faces the face plate 32. The first bonding material 1 is provided to enhance adhesive performance of the bonding portion. Therefore, although the first bonding material 1 is applied over the whole circumference of the surface (of the supporting frame 26) which faces the face plate 32 in the embodiment, it is not always necessary to use such a method. Specifically speaking, the first bonding material 1 may be discretely arranged along the second bonding material 2 arranged in the annular loop. However, in this case, since the first bonding material specifies the height (thickness) of second bonding material, it is also necessary to be arranged in abutting (side-to-side) relationship. As illustrated in FIGS. 4A and 4B, underlying layers 4a and 4b can be also preliminarily formed on the supporting frame 26 and the face plate 32 in order to enable the second bonding material 2 to be easily bound.

(Step S2: Pressing Step)

Subsequently, spacers 8 are arranged on the wirings 27 and 28 (refer to FIG. 2E). Onto the surface of the supporting frame 26 coated with the first and second bonding materials 1 and 2, the surface (of the face plate 32) which faces such a surface of the supporting frame 26 is pressed (refer to FIGS. 2F and 2G). FIG. 3A is a plan view in the state of FIG. 2G. Therefore, the second bonding material 2 is deformed and its height decreases gradually and coincides with a height of first bonding material 1. Thus, the second bonding material and the first bonding material 1 are together come into contact with the face plate 32.

(Step S3: Heating Step)

Subsequently, only a part of the first bonding material 1 is heated and melted, then, only another part different from such a part is heated and melted, and this step is further repeated only the necessary number of times (refer to FIG. 2H). That is, the first bonding material 1 is sequentially heated and melted part by part. Specifically speaking, in a state where the face plate 32 has been press-bonded to the supporting frame 26 through the second bonding material 2, the pressing is cancelled and only a portion of the first bonding material 1 to be melted is locally and partially heated. FIG. 3C is a plan view in the state of FIG. 2G. In each heating step, a plurality of positions or a plurality of portions of the first bonding material 1 may be simultaneously locally heated (refer to FIG. 3B-1) or only one position or one portion may be locally heated (refer to FIG. 3B-2). In the heating step, it is desirable to heat and melt the whole first bonding material 1 by heating the first bonding material 1 a plurality of times while changing the heating position of the first bonding material 1.

It is sufficient that the pressing is cancelled between the steps of FIGS. 2G to 2H. That is, the pressing can be cancelled after the second bonding material 2 was pressed and deformed to the height of first bonding material 1 as illustrated in FIG. 2G or the processes up to the pressing may be performed until the heating step of FIG. 2H while keeping the pressed state. In the heating step, as illustrated in FIGS. 5A to 5C, the first bonding material 1 may be sequentially heated and melted while scanning the heating position along the first bonding material 1.

(Step S4: Cooling Step)

The heated and melted portion of the first bonding material 1 is cooled. Thus, while the supporting frame 26 and the face plate 32 are sealed by the second bonding material 2, they are strictly fixed by the first bonding material 1.

(Step S5: Baking Step)

In order to raise a vacuum degree of the space in an envelope 10, the baking is performed at a predetermined temperature (first temperature) after the heating step. Specifically speaking, the envelope 10 is placed in a vacuum chamber (not shown). While evacuating the inside of the envelope 10 through an exhaust hole 7, a vacuum degree in the chamber is reduced to a value on the order of $10^{-3}$ Pa and the whole envelope 10 is heated, thereby activating the non-evaporable getter 37. Further, the exhaust hole 7 is sealed by a sealing material 6 and a sealing cover 5, thereby forming the image forming apparatus 11. Although it is desirable that the sealing cover 5 is made of the same material as that of the rear plate 22, it may be made of a metal such as Al, Ti, Ni, or the like or its alloy which is not melted during the vacuum baking.

Figure 6:
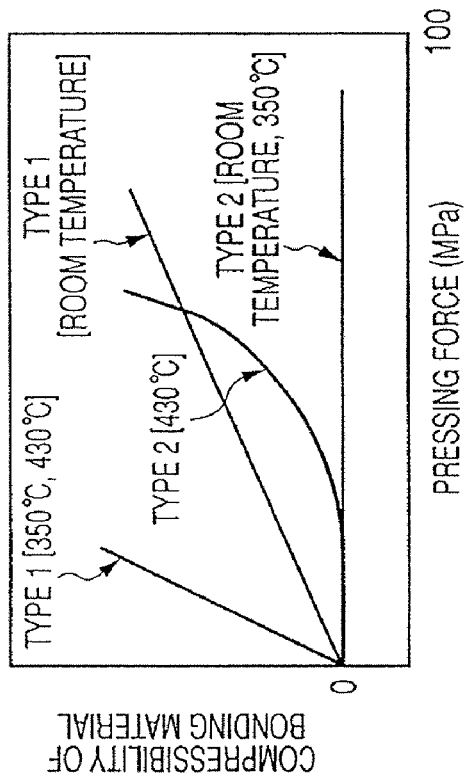
FIG. 6 is a diagram illustrating an example of a relation between a pressing force of a bonding material which is used in the invention and a compressibility.

FIG. 6 is a graph illustrating a concept of a compressibility to a pressing force. Assuming that a height of bonding material at an initial stage is set to $z(0)$, a height of bonding material at a pressing force $P(Pa)$ is set to $z(P)$, and a height distortion is set to $\Delta z(P)=z(0)-z(P)$, the compressibility is defined by $$\Delta z(P)/z(0)=1-z(P)/z(0)$$

The compression denotes a total of a compression in the height direction due to an elastic deformation and a compression in the height direction due to a plastic deformation. When the compressibility is equal to 0, this means that the compression is not performed and shows that the compression is more liable to be performed with an increase in compressibility. "The compressibility of the second bonding material to a pressing force is larger than the compressibility of the first bonding material to a pressing force" means that in a range of the pressing force which is presumed, the compressibility of the second bonding material exceeds the compressibility of the first bonding material. In other words, "the compressibility of the first bonding material to the pressing force is smaller than the compressibility of the second bonding material to the pressing force" means that in a range of the pressing force which is presumed, the compressibility of the first bonding material is below the compressibility of the second bonding material. The presumed pressing force range is not always necessary to a continuous width (range) but may be discretely set.

It is desirable to previously measure a relation between the height $z(P)$ of bonding material and the pressing force $P(Pa)$ at at least a room temperature (25° C.) and temperatures necessary in the steps (for example, 350° C., 430° C., and the like). Since the actual compressibility depends on not only the material of the bonding material but also a cross sectional shape, a size, and a degree of deformation of the placing surface, when the compressibility is measured, it is desirable to decide measuring conditions according to processes to be executed. Further, in the case of using, particularly, a metal material of a low melting point or the like, since the compressibility of the material also depends on a width of material, it is desirable to measure it at the width which is actually used.

In FIG. 6, the compressibilities of two kinds of materials are shown by using the temperature as a parameter. According to the material of Type 1, it can be deformed even at the room temperature (25° C.) when the pressing force is applied and is further liable to be deformed at 350° C. and 430° C. According to the material of Type 2, although it is not deformed at the room temperature (25° C.) and 350° C. when the pressing force of up to about 50 MPa is applied, it is deformed at 430° C. when the pressing force is applied. In the embodiment, the material of Type 2 is used as a first bonding material 1 and the material of Type 1 is used as a second bonding material 2. Therefore, the compressibility of the second bonding material to the pressing force is larger than the compressibility of the first bonding material to the pressing force.

It is necessary that the bonding material which can be applied to the envelope of the image forming apparatus satisfies the further following conditions.

1. Thermal durability: Thermal durability in the baking step in the vacuum (foregoing step S5).
2. Hermetic sealing: Hermetic sealing adapted to maintain a high vacuum with the elapse of time.
3. Adhesive performance: Adhesive performance with the member to be bound (frame member, face plate material).
4. Characteristics of ejection gas: Characteristics of the low ejection gas.

As a first bonding material 1 which satisfies the above conditions and the conditions of FIG. 6, a glass frit subjected to the baking in order to burn out at least an organic bonding, a metal such as Al, Ti, Ni, or the like, or its alloy can be mentioned. As a second bonding material 2, a metal such as In, Sn Al, Cu, Au, Ag, or the like or its alloy can be mentioned. A metal of a low melting point such as In, Sn, or the like or a metal of a low melting point made of an alloy using In—Ag or Sn—Ag is one of the most desirable materials of the second bonding material 2.

When the pressing force is applied to the second bonding material 2 at the room temperature from FIG. 2F toward the state of FIG. 2G, since the material of Type 1 is deformed at the room temperature, its height decreases gradually and it is deformed to the height of bonding material 1. However, since the first bonding material 1 using the material of Type 2 is not deformed to 50 MPa, a thickness of second bonding material 2 becomes stable at the height of bonding material 1 and does not decrease any more. That is, since the compression deformation of the second bonding material 2 is restricted by the first bonding material 1, a possibility that the thickness of second bonding material 2 fluctuates depending on the position during the pressing step decreases largely.

Since the heating step is executed at about 430° C. (second temperature), the first bonding material 1 is also melted and the compression deformation is liable to occur. However, since the first bonding material 1 is heated and melted by the method whereby only a part of the first bonding material 1 is heated and melted and only another part different from such a part is then heated and melted, that is, the first bonding material 1 is sequentially heated and melted part by part as mentioned above, the whole first bonding material 1 is not simultaneously melted. In other words, since the portions of the first bonding material 1 which are not heated and melted support the pressing force from the face plate as if they were what are called leg portions, the whole shape of the first bonding material 1 is maintained. Therefore, even in the heating step, a possibility that the thickness of second bonding material 2 fluctuates depending on the position decreases largely.

Further, after the heating step, the first bonding material is subjected to the evacuation and the baking at a temperature of about 350° C. (first temperature) lower than that in the heating step (refer to FIG. 2H). However, since the compressibility of the first bonding material is substantially equal to 0 at this temperature, the first bonding material 1 is not deformed. Therefore, even in the baking step, a possibility that the thickness of second bonding material 2 fluctuates depending on the position decreases largely. In this manner, a possibility that the thickness of second bonding material 2 which realizes the sealing function fluctuates along the circumferential length in the pressing step, heating step, and baking step decreases and the sealing performance of higher reliability can be effected.

Although the compression deformation of the first bonding material 1 in the pressing step is substantially equal to 0 in the example of FIG. 6, even when the small deformation occurs, if the compressibility of the first bonding material is smaller than that of the second bonding material 2, the compression deformation of the second bonding material 2 can be still prevented.

EXAMPLES

The invention will be described further in detail with respect to specific Examples. The image forming apparatus in each of the following Examples has the face plate 32 and the rear plate 22 (refer to FIG. 1). In the rear plate 22, a plurality of (240 rows×720 columns) surface conduction electron-emitting devices 27 is arranged on a glass substrate 21 in a simple matrix form so as to be electrically connected to the X-directional wirings 28 and the Y-directional wirings 29. In the face plate 32, the metal back 36 made of an Al thin film is formed on the phosphor film 34 as an image forming member by a sputtering method so as to have a thickness of 0.1 μm. Further, a Ti film is formed as a non-evaporable getter 37 by an electron beam vacuum evaporation depositing method as to have a thickness of 0.1 μm.

Example 1

Baking After Applying the Glass Frit+In+Tack

First, the relation between the pressing force and the compressibility of the bonding material as illustrated in FIG. 6 is measured at the room temperature, 350° C., and 430° C., respectively. In this Example, the glass frit (Type 2 in FIG. 6) whose thickness does not change at 350° C. is used as a first bonding material 1. In which is softener than the first bonding material 1 and can be pressed and deformed even at the room temperature is used as a second bonding material 2.

Step-a

The rear plate 22 and the supporting frame 26 are bound by a glass frit 3 (FIG. 2A).

Step-b

Subsequently, a paste obtained by mixing terpineol, elvasite, and the glass frit serving as a base material of the first bonding material 1 is applied as a precursor of the first bonding material 1 onto the whole circumference of the supporting frame 26 by using a dispenser so as to have a thickness of about 0.5 mm and a width of 2 mm (FIG. 2B).

Step-c

The precursor of the first bonding material 1 applied in step-b is baked at 430° and an organic material such as terpineol or the like is burned out, thereby forming the first bonding material 1 having a thickness of 0.3 mm and a width of 2 mm (FIG. 2C).

Step-d

The second bonding material 2 made of In having a thickness of 5 mm and a width of 2 mm is arranged inside of the first bonding material 1 along the underlying layer 4a having a width of 2 mm and a film thickness of 5 μm on the whole circumference of the supporting frame 26 by using an ultrasonic soldering apparatus (FIG. 2D). The underlying layer 4a is previously formed by baking the silver paste.

Step-e

After that, the spacer 8 is arranged on the wirings so that its height is lower than the height of second bonding material 2 and is almost equal to the height of first bonding material 1 (FIG. 2E).

Steps-f,g

The rear plate 22 on which the spacer 8 has been arranged and the face plate 32 on which the underlying layer 4b having a width of 2 mm and a film thickness of 5 μm has been formed are positioned at a predetermined position (FIG. 2F), thereby allowing the face plate 32 to become into contact with the first bonding material 1. That is, the second bonding material 2 is pressed and deformed down to the thickness of first bonding material 1 and the hermetic sealing is assured by the second bonding material 2 (FIG. 2G, FIG. 3A). The underlying layer 4b is previously formed by baking a silver paste.

Step-h

Subsequently, light emitted from a halogen lamp is converged from the face plate 32 side and is simultaneously irradiated to a plurality of positions of the first bonding material 1 (FIG. 2H, FIG. 3B-1), thereby allowing the first bonding material 1 to be melted part by part. Thus, the envelope 10 having the face plate 32, supporting frame 26, and rear plate 22 is formed (FIG. 2H, FIG. 3C).

Step-i

Subsequently, the envelope 10 is placed in the vacuum chamber (not shown). While evacuating the inside of the envelope 10 through the exhaust hole 7, the vacuum degree in the chamber is reduced to a value on the order of $10^{-3}$ Pa and the whole envelope 10 is heated to 350° C., thereby activating the non-evaporable getter 37. Thereafter, the exhaust hole 7 is sealed by the sealing material 6 made of In and the sealing cover 5 made of the glass substrate, thereby forming the image forming apparatus 11 (FIGS. 1, 2I, 4A, and 4B).

In the image forming apparatus 11 of Example manufactured as mentioned above, since the first bonding material 1 is partially and locally melted (step-h), the height of first bonding material 1 (glass frit) is not changed. Therefore, the thickness of second bonding material 2 (In) is held. Further, also in step-i, although In as a second bonding material 2 enters the melting state at the time of heating at 350° C., since the glass frit as a first bonding material 1 is not melted, the thickness of second bonding material 2 (In) is held. Therefore, the image forming apparatus having the excellent hermetic sealing can be obtained. Since the face plate 32 and the supporting frame 26 are fixed by the first bonding material 1 and the supporting frame 26 and the rear plate 22 are fixed by the glass frit 3, respectively, a predetermined relative positional relation among those members is also held.

Example 2

Baking After Applying the Glass Frit+In+Tack+Laser

In this Example, the laser irradiation is used in step-h. Specifically speaking, a semiconductor laser having a wavelength of 810 nm, an effective diameter of 0.8 mm, and a power of 100 W is partially, locally, and simultaneously irradiated to a plurality of positions of the first bonding material 1 (FIG. 3B-1), thereby allowing the first bonding material 1 to be melted. Thus, the envelope 10 having the face plate 32, supporting frame 26, and rear plate 22 is formed (FIG. 3C). Other steps are similar to those in Example 1.

In the image forming apparatus of Example manufactured as mentioned above, the first bonding material 1 is partially and locally melted by using the laser irradiation, thereby bonding the face plate 32 and the supporting frame 26. Therefore, the thickness of second bonding material 2 (In) is further liable to be held and the hermetic sealing is further improved. Particularly, if the laser irradiation is used, the laser can be accurately irradiated even in a narrow region and the local heating can be further effectively performed. Thus, the uniformity of the thickness (height) of second bonding material 2 is improved and the higher hermetic sealing is obtained.

Example 3

Baking After Applying the Glass Frit+In+Whole Circumference+Laser

In this Example, as illustrated in FIGS. 5A to 5C, in step-h, the laser irradiation is sequentially irradiated to the first bonding material 1 while partially, locally, and continuously scanning it (FIG. 5B), thereby allowing the first bonding material 1 to be melted. Thus, the envelope 10 having the face plate 32, supporting frame 26, and rear plate 22 is formed (FIG. 5C). Other steps are similar to those in Example 1.

In the image forming apparatus in this Example manufactured as mentioned above, the first bonding material 1 is continuously, partially, and locally melted and the face plate 32 and the supporting frame 26 are bound. Therefore, even in the first bonding material 1 itself, the sealing performance can be held and the hermetic sealing of the image forming apparatus is improved. In addition, reproducibility is also improved and a variation on manufacturing is improved.

Example 4

Sheet Glass Frit+In+Whole Circumference+Laser

In this Example, after the second bonding material 2 was arranged, the glass frit having a width of 2 mm and a thickness of 300 μm which has previously been baked in a sheet shape is arranged as a first bonding material 1 on the outside whole circumference of the second bonding material 2. Other steps are similar to those in Example 1.

In the image forming apparatus of this Example manufactured as mentioned above, the first bonding material 1 is continuously, partially, and locally melted and the face plate 32 and the supporting frame 26 are bound. Therefore, even in the first bonding material 1 itself, the sealing performance can be held and the hermetic sealing of the image forming apparatus is improved. In addition, the reproducibility is also improved and the variation on manufacturing is improved. Further, since the glass frit has previously been baked in a sheet shape in this Example, the step of FIG. 2B can be omitted, the placing step of the second bonding material 2 (FIG. 2D) can be executed first, and the like. There is, consequently, an effect that a degree of freedom of the processes increases.

Example 5

Al+In+Whole Circumference+Laser

In this Example, Al (aluminum) foil having a width of 2 mm and a thickness of 50 μm is used as a first bonding material 1 and In having a width of 2 mm and a thickness of 100 μm is used as a second bonding material 2. Other steps are similar to those in Example 4. Al is selected as a material which is harder (whose compressibility is smaller) than the second bonding material 2 made of In at the room temperature and at 350° C.

In the image forming apparatus in this Example manufactured as mentioned above, an effect similar to that in Example 4 is obtained. By using the Al foil, the step of FIG. 2B can be omitted, the placing step of the second bonding material 2 (FIG. 2D) can be executed first, and the like. There is, consequently, an effect that a degree of freedom of the processes increases. Since the metal is used, an ejection gas at the time of the evacuation and the baking (FIG. 2I) can be reduced and the vacuum degree in the envelope is improved.

Example 6

Glass Frit+In+Whole Circumference+Laser

Figure 7:
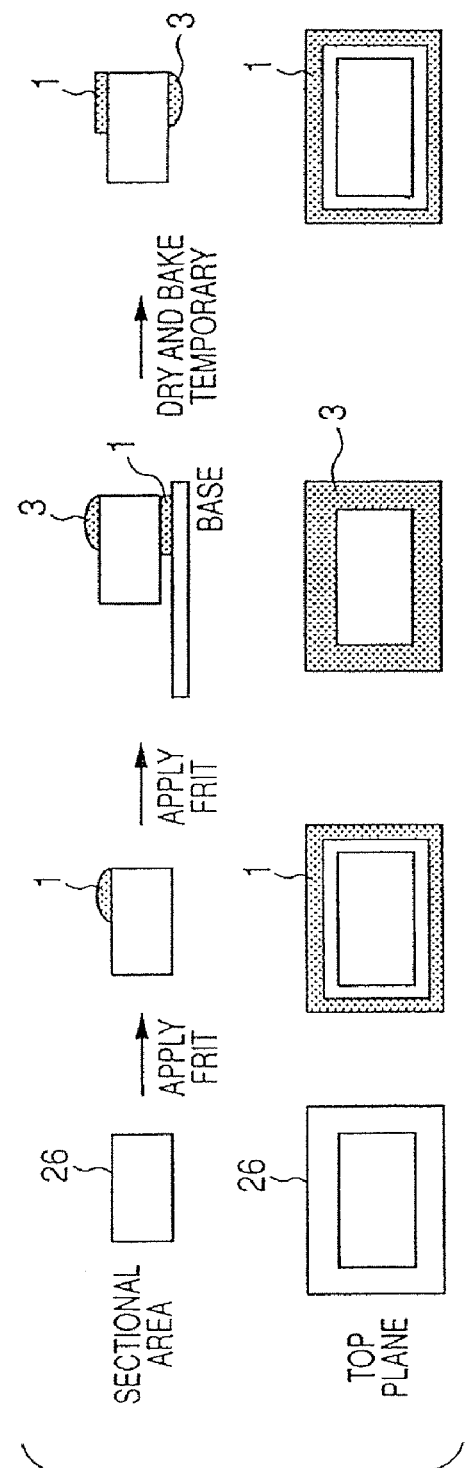
FIG. 7 is a schematic diagram illustrating an example of processes according to Example 6.

In this Example, as illustrated in FIG. 7, a paste obtained by mixing terpineol, elvasite, and the glass frit serving as a base material of the first bonding material 1 is applied onto the outside whole circumference of one surface of the supporting frame 26 having a width of 4 mm which has been heated to 80° C. by using a dispenser so as to have a width of 2 mm and a thickness of 0.5 mm. After that, the supporting frame 26 is reversed, put onto an Al plate, pressed and deformed, and flattened so as to have a thickness of 0.4 mm. Thereafter, the same paste is applied onto another surface of the supporting frame 26 so as to have a width of 4 mm and a thickness of 0.8 mm. That is, the glass frits are sequentially provided for two opposite surfaces of the supporting frame 26. Subsequently, the supporting frame 26 is temporarily baked at 380° C., thereafter, the supporting frame 26 is peeled off from the Al plate and reversed again. The frits which are not flattened yet are come into contact with the rear plate and the supporting frame 26 is arranged at a predetermined position on the rear plate 22. Thereafter, the supporting frame 26 is baked at 430° C. The baking of the first bonding material 1 having a width of 2 mm for bonding the supporting frame 26 and the rear plate 22 and the baking of the glass frit 3 are simultaneously executed, thereby obtaining the state of FIG. 2C. A thickness of first bonding material 1 in this instance is equal to 0.3 mm.

After that, an Sn—Ag system alloy having a width of 2 mm and a thickness of 500 μm is used as a second bonding material 2. The steps of FIGS. 2F and 2G are executed at 150° C. In a step of FIG. 2I, an Al plate is used as a sealing cover 5 and the Sn—Ag system alloy is used as a sealing material 6. The image forming apparatus is formed by a method similar to that of Example 3 with respect to other steps. According to the image forming apparatus of this Example manufactured as mentioned above, an effect similar to that in Example 3 can be obtained.

Although the embodiment and Examples of the invention have been described above, the invention is not limited to them. For example, although the invention has been applied to the bonding portion of the supporting frame 26 and the face plate 32 in the foregoing embodiment and Examples, the invention may be applied to the bonding portion between the supporting frame 26 and the rear plate 22. Similarly, the invention can be also applied to both of the bonding portion of the supporting frame 26 and the face plate 32 and the bonding portion of the supporting frame 26 and the rear plate 22. Although the invention has been applied only to the bonding portion of the supporting frame 26 and the face plate 32 in the foregoing embodiment and Examples, this is because the bonding portion of the supporting frame 26 and the rear plate 22 can be made relatively thick and the sealing performance is liable to be assured. In the case of applying the invention to the bonding portion of the supporting frame 26 and the rear plate 22, it is also possible to place the rear plate 22 under the supporting frame 26, apply the first and second bonding materials onto the rear plate 22, and deform the second bonding material by the supporting frame 26.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-168883, filed Jun. 27, 2007, and No. 2008-144695 Jun. 2, 2008 which are hereby incorporated by reference herein in their entirety.

What is claimed is:

1. A manufacturing method of a hermetically sealed container, comprising steps of:
    placing a first bonding material and a second bonding material on one of surfaces disposed in opposition to each other of first and second members forming the hermetically sealed container,
    wherein a compressibility of the second bonding material is larger than a compressibility of the first bonding material in relation to a pressing force, and
    the second bonding material is placed in an annular loop on the one of the surfaces disposed in opposition to each other of the first and second members, the first bonding material is arranged at an outside of the second bonding material placed in the annular loop, in abutting to the second bonding material, and the first bonding material has a height lower than a height of the second bonding material;
    pressing the first and second bonding materials by the other of the surfaces disposed in opposition to each other of the first and second members, such that both of the first and second bonding materials contact the other of the surfaces disposed in opposition to each other of the first and second members;
    heating the first bonding material contacting the other of the surfaces disposed in opposition to each other of the first and second members.

2. The manufacturing method of the hermetically sealed container according to claim 1, wherein
    the step of heating involves heating simultaneously a plurality of portions of the first bonding material.

3. The manufacturing method of the hermetically sealed container according to claim 1, wherein
    the step of heating involves heating all of the first bonding material by a plural times of heating while changing heating portions from one position to the other portion of the first bonding material.

4. The manufacturing method of the hermetically sealed container according to claim 1, wherein
    the step of heating involves heating the first bonding material successively by scanning with a heating position along the first bonding material.

5. The manufacturing method of the hermetically sealed container according to claim 1, wherein
    the step of heating involves a local heating the first bonding material.

6. The manufacturing method of the hermetically sealed container according to claim 5, wherein
    the local heating is conducted by a laser.

7. The manufacturing method of the hermetically sealed container according to claim 5, wherein
    the local heating is conducted by a light irradiation by a halogen lamp.

8. The manufacturing method of the hermetically sealed container according to claim 1, wherein
    the first and second members are formed from glass, and the first bonding material is formed from metal or frit glass.

9. The manufacturing method of the hermetically sealed container according to claim 1, wherein
    in the step of placing, as the first bonding material, a glass frit baked in a sheet shape is used.

10. The manufacturing method of the hermetically sealed container according to claim 1, wherein
    in the step of placing, as the first bonding material, aluminum of a sheet shape is used.

* * * * *